July 7, 1931.  E. WILDHABER  1,813,372
GRIPPING DEVICE
Filed Feb. 23, 1928   3 Sheets-Sheet 1
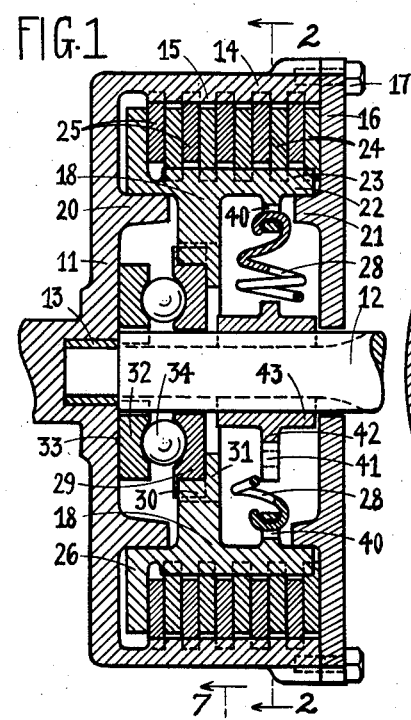
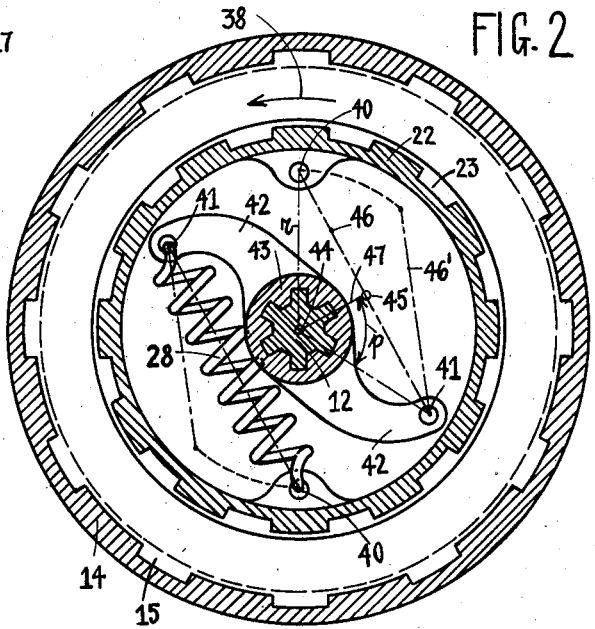
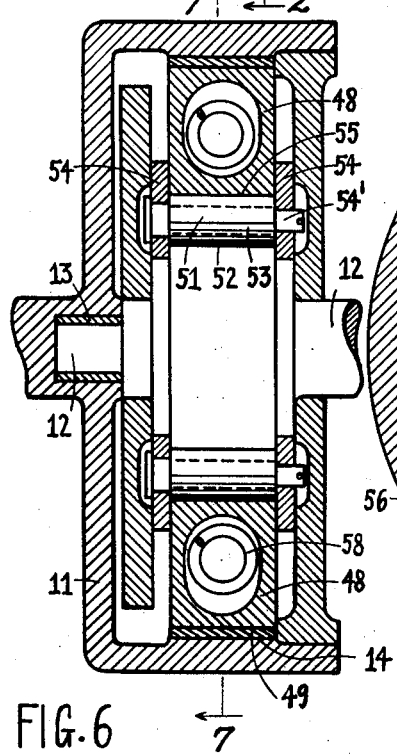
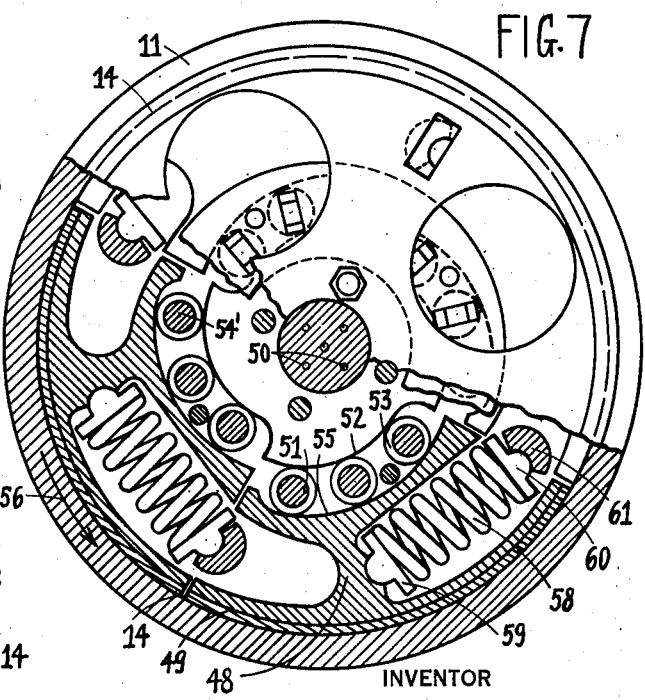
INVENTOR
Ernest Wildhaber July 7, 1931.  E. WILDHABER  1,813,372
GRIPPING DEVICE
Filed Feb. 23, 1928  3 Sheets-Sheet 2
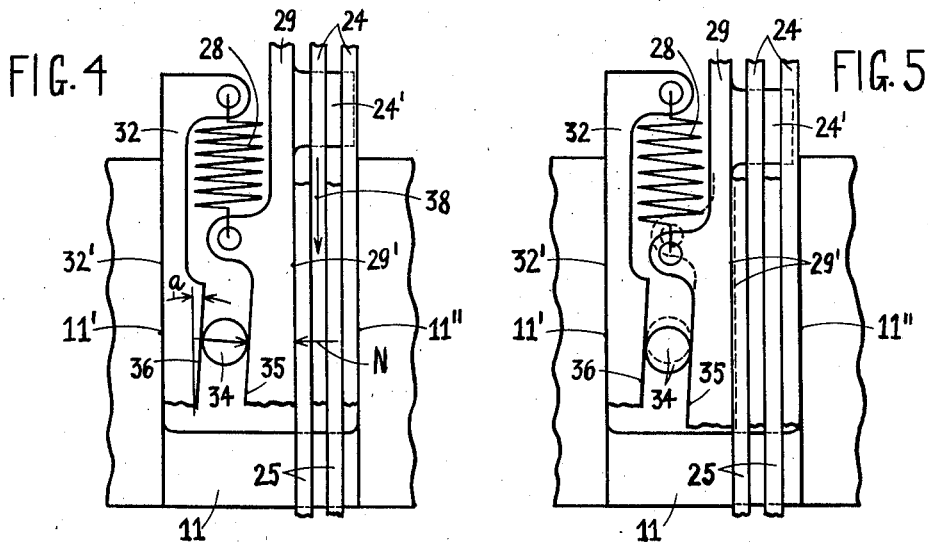
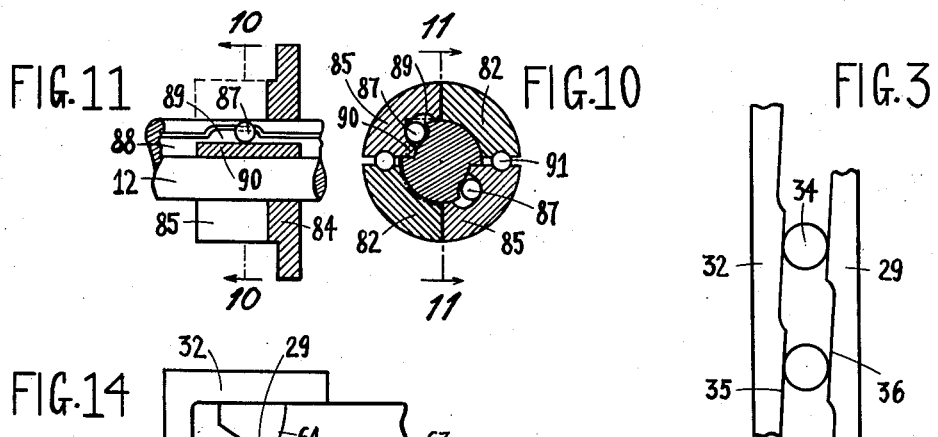
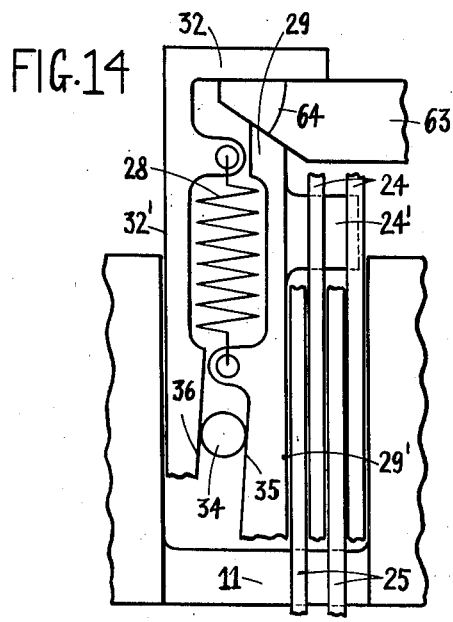
INVENTOR
Ernest Wildhaber July 7, 1931. E. WILDHABER 1,813,372
GRIPPING DEVICE
Filed Feb. 23, 1928 3 Sheets-Sheet 3

INVENTOR
Ernest Wildhaber

Patented July 7, 1931

1,813,372

UNITED STATES PATENT OFFICE

ERNEST WILDHABER, OF BROOKLYN, NEW YORK

GRIPPING DEVICE

Application filed February 23, 1928. Serial No. 256,283.

The present invention relates to gripping devices operating through frictional contact and permitting slippage at large loads. The invention moreover relates to friction clutches, and particularly to friction clutches of the types used in automotive vehicles.

One drawback of devices of this character is the fact that slippage occurs only in case of very excessive shocks. Ordinary shocks still pass through such devices. This is due to the fact that the coefficient of friction is much larger for rest than for relative motion. That holds true for friction between dry surfaces and even more so for friction between lubricated surfaces, that is for frictional surfaces running in oil or liable to get moistened with oil. The springs which effect pressure between the frictional surfaces are naturally dimensioned to effect a pressure sufficient to transmit a desired full load torque under the conditions of relative motion, where the coefficient of friction is a minimum. In consequence a much larger torque may be transmitted through frictional contact, when the contacting frictional surfaces are relatively at rest.

One purpose of the present invention is to provide a gripping device and a friction clutch, which does not transmit shocks irrespective of the changes of the coefficient of friction. Another object is to provide a clutching device and a friction clutch which slips at the same maximum load, irrespective whether the frictional surfaces are relatively at rest or relatively in motion. A further object is to provide a friction clutch of simple construction, which is suited to operate as a shock filter and in which said feature is incorporated without any substantial addition or complication. Another aim is to provide a friction clutch which may be suddenly dropped into engagement, and which nevertheless operates smoothly. Another object is to provide a multiple disk friction clutch suited to run in oil and capable of slipping practically at the same load under all conditions.

Further objects will appear in the course of the specification and from recital of the appended claims.

Embodiments of my invention are illustrated in the accompanying drawings, in which Fig. 1 is an axial section through a gripping device made in accordance with the present invention, that is to say of a safety member which transmits not more than a certain maximum torque, which is substantially the same under all conditions.

Fig. 2 is a section taken at right angles to the axis of said device, along line 2—2 of Fig. 1.

Fig. 3 is a partial development of the periphery of a cylindrical section through detail members used in the embodiment according to Fig. 1 and Fig. 2.

Fig. 4 and Fig. 5 are diagrams explanatory of the principles of the embodiment of my invention illustrated in the Figures 1 and 2.

Fig. 6 is an axial section through a safety gripping device illustrating a modification of my invention.

Fig. 7 is a view partly in elevation and partly in section along line 7—7 of Fig. 6.

Fig. 10 is a section along line 10—10 of Fig. 8, illustrating an antifriction arrangement.

Fig. 11 is a view of a spline shaft, taken at right angles to its axis, and a section through an operating member, along line 11—11 of Fig. 10.

Fig. 14 is a diagram explanatory of the principle of a multiple disk clutch constructed in accordance with the present invention.

Figure 8:
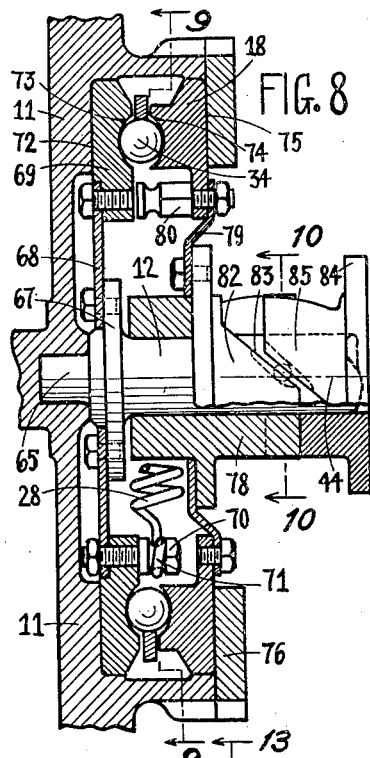
Fig. 8 is an axial section, partly in elevation of a friction clutch formed in accordance with the present invention.

In Fig. 1 and Fig. 2, the numerals 11 and 12 denote two coaxial rotary members, which are connected by frictional engagement.

Shaft 12 reaches into member 11 in which a bearing is formed at 13. The two members 11 and 12 are further journalled on the outside in conventional manner not further indicated. Member 11 is in the form of a casing, having a cylindrical portion 14, provided with recesses 15 (see Fig. 2) which extend in the direction of the axis of said member. A cover 16 is rigidly bolted to portion 14, by means of screws 17.

Inside of the casing formed by member 11 and cover 16, a part 18 is mounted in such manner, that it can turn angularly with respect to said casing to a certain extent and move axially in said casing. Part 18 is rotatably held on one side by a projection 20 of part 11 and on the other side by a projection 21 of cover 16. Part 18 contains a cylindrical portion 22 provided with splines 23, with which engage disks 24 which alternate with other disks 25 engaging with the splines and recesses 15 provided in cylindrical portion 14 of member 11. The disks 24 and the disks 25 are therefore positively connected with the part 18 and member 11 respectively. They are suited to transmit torque to said part and to said member, while yet being movable axially in said splines.

Part 18 is provided with a flange 26, through which pressure may be effected between disks 24 and 25 by moving part 18 to the right, referring to Fig. 1. A pair of tension springs 28 connect part 18 with member 12. The action of said springs will be further explained hereafter. A ring shaped body 29 is rigidly secured to part 18 in any suitable manner, such as by splines 30 for angularly securing said body to part 18, by a flange 31 for axially holding said body in one direction, namely in the direction of thrust, and preferably also by small screws (not shown) for securing it in the other direction, Body 29 contains a plurality of grooves of circular cross section, extending along concentric helices of equal lead, each groove occupying a fraction of the circumference. Corresponding grooves are provided on a body 32, which engages splines of member or shaft 12 and which contacts on one side 33 with member 11. Between each pair of corresponding grooves of bodies or members 29 and 32 a ball 34 is provided. The totality of balls may be held together with a cage, which is of the character of the cages used in ball bearings, and which is not illustrated. A partial view of the two parts 29, 32 is shown in Fig. 3. This view is a development of a cylindrical surface, whose axis coincides with the axis of the two members 11 and 12, and whose surface passes through the centers of balls 34. In development helices show as straight lines, and the helical grooves are therefore indicated as straight lines 35, 36 in Fig. 3. I preferably provide a plurality of helical grooves on each part, individual grooves being identical. When a small number of grooves is provided, such as two or three, each groove occupying one half of one third of the circumference respectively, a plurality of rolling members, especially balls, are provided in each groove. Usually, however, a larger number of grooves are provided, and single balls in the individual grooves, as shown in Fig. 3. A larger number of grooves permits the reduction of the axial width of the unit formed by the two parts 29, 32 and the intermediate balls, because only a small fraction of the lead of the grooves is then embodied on the parts 29, 32.

The two parts provide guides, along which one part may move in a helical path relatively to the other. It is understood that the rolling means could also be omitted. The guides are then simply screw threads.

The device is applied preferably in such cases, where a motor exerts torque most of the time in the same direction, such as in the direction of arrow 38, Fig. 2. The hand of the helices is then made such, that the torque exerted on part 18 in the direction of arrow 38 tends to move body 29 and with it part 18 to the left, see Fig. 1, that is to say it tends to disengage the disks 24, 25 and to reduce pressure between said disks. On the other hand the tension springs 28 act in opposite direction. They tend to rotate part 18 in a direction oppositely to arrow 38, and to increase pressure between the disks 24, 25.

The action of the device will now be explained with reference to the diagrams Fig. 4 and Fig. 5.

The two sides 29′, 32′ of the parts 29, 32 may be separated or approached by moving said parts along the guides provided by grooves 35, 36, which contact with one another through balls 34. Disks 24 are positively connected with part 29, as diagrammatically indicated by a projection 24′, which may be supposed to positively hold the disks 24 while still permitting displacement of said disks at right angles to side 29′. Separation of the two sides 29′ and 32′ diminishes the space intermediate the sides 11′ and 11″ of a member 11, and increases pressure between the disks 24 and the adjacent disks 25, which latter are positively connected with member 11. A tension spring 28 serves to separate sides 29′ and 32′ and to increase said pressure. Tension spring 28 is here diagrammatically shown attached to the two parts 29, 32, a feature which is unessential, as long as the spring increases the said pressure. Torque transmitted to the disks 24 through friction acts in the opposite direction, namely in the direction of arrow 38, and therefore tends to approach the two sides 29′, 32′ and to reduce the pressure between adjacent disks.

Spring 28 can be so proportioned and disposed, that a practically constant torque is exerted by the spring, irrespective of its deformation. The spring can however also be so proportioned and disposed, that different torques and especially increasing torques are exerted by the spring at increasing deformations, that is to say at increasing distances between the attached ends of the spring. All this will be further explained hereafter. Preferably the torque is kept constant or approximately constant, irrespective of the deformation of the spring. The operation of the device will be explained with respect to this latter case. For convenience the said constant torque exerted by the spring is denoted $T_o$. When the torque exerted upon part 29 through the frictional contact with disks 25 and member 11 exceeds torque $T_o$, then part 29 immediately starts to move in the direction of the torque, thereby reducing the pressure between the surfaces engaged in frictional contact. This continues until said pressure is small enough to permit slippage. As then the frictional torque tends to drop further, on account of the sudden reduction of the coefficient of friction, the spring draws part 29 back again, up to a point, where the pressure exerted is sufficient to transmit said torque. It is understood that this play or operation of the device occurs very rapidly, so that the result is the same, as if the (maximum) torque had been constantly $T_o$.

In Fig. 5 a position of part 29 is shown in full lines, which corresponds to a motion of said part in the direction of the frictional torque, as compared with Fig. 4. The position of part 29 according to Fig. 4 is partly shown in dotted lines in Fig. 5, for comparison. As part 29 moves in the direction of the torque, the ball 34 rolls from the dotted position to the one shown in full lines, and part 29 rolls on ball 34 the double distance. Back 29′ thereby recedes from the dotted position to the full line position, with a consequent reduction in exerted pressure.

The inclination angle ($a$) of the grooves 35, 36 with respect to lines 29′, 32′ is kept very small, and has been shown exaggerated in the drawing. In the above explanation, the influence of this angle has been justly neglected as a small quantity. In order to avoid the objection of inaccuracy, the operation of the device will now also be considered in full accuracy. Inasmuch as ball 34 rolls in groove 35, it causes practically no friction, and the load exerted through said ball is perpendicular to line 35. The component of said load, which component extends at right angles to line 29′, may be called the normal load or pressure and may be designated with N. Inasmuch as the load exerted through ball 34 is inclined at an angle $a$ with respect to N, the component of said load, which is exerted in the direction of the frictional pull (F) equals (N tan $a$).

The conditions of equilibrium of forces demand that the following equation be fulfilled:

$$F = T - N \tan a,$$

wherein T denotes the pull of the spring, Fig. 4.

When the frictional pull is derived from a plurality of frictional engagements, that is to say from a plurality of disks, the frictional pull is a large fraction of the pressure N, and can be made even a multiple of said pressure, if so desired. The second member, which contains the small quantity tan $a$, therefore modifies the result (F=T) only very little. It reduces slightly the maximum frictional pull, which may be transmitted at large pressures N. Large pressures N correspond to small frictional coefficients. The result is consequently, that the maximum frictional pull transmitted is not absolutely constant, when the pull T of the spring is constant, but suffers a slight reduction at decreasing coefficients of friction.

The disposition of the springs 28 will now be further described with reference to Fig. 1 and Fig. 2.

Cylindrical portion 22 of part 18 contains projections having holes 40 suited to hold one end of springs 28. Other holes 41 are provided in arms 42, which project from a hub 43. The latter is rigidly secured to shaft 12 through splines provided on said shaft. The tension springs extend from the holes 40 to the holes 41, said holes marking the end points of the springs. Preferably the holes 40 and 41 are disposed at equal distance $r$ from the axis 44 of the device. Springs of maximum length can then be used inside of a given diameter. 45 denotes the point of closest approach of the center line 46 of the spring to the axis 44. The said point lies on the perpendicular 47 to center line 46 and bisects the length of the spring, when the ends are at equal distances $r$ from axis 44.

It is noted that the ends of the spring 28 are disposed on opposite sides of the points 45 of closest approach, and that both end points are located at distances from point 45 in excess of one quarter of the length of the spring between said end points.

With a disposition as indicated, the torque exerted by the springs can be kept very nearly constant and practically independent of the deformation of the springs.

In the embodiment of Fig. 1 and Fig. 2 the frictional surfaces are planes. Fig. 6 and Fig. 7 illustrate a modified gripping device constructed in accordance with my invention, with frictional engagement provided along a cylindrical surface. Member 11 contains a cylindrical surface 14 suited to transmit torque through frictional engagement. Shoes 48 may be provided on the outside with a lining 49 with which they may engage the cylindrical surface 14 of member 11. The said shoes 48 can turn a certain angle on centers 50. Partial roller bearings 51, occupying a fraction of the circumference only, permit of such angular motion with a minimum of friction. Bearings 51 consist of inner races 52, which are integral with each other, of rollers 53, of a joint cage 54 containing pins 54' reaching through the rollers 53, and of outer races 55 which form part of the shoes 48. The centers 50 of the partial bearings 51 are so disposed that a movement of the shoes on their centers, in the direction of arrow 56, lifts the linings 49 from the cylindrical surface 14, that is to say decreases frictional engagement, and movement opposite to arrow 56 increases engagement. The shoes are kept in engagement with surface 14 by springs 58, which act on plates 59 pivoted on shoes 48 and which adjacent their other end stand on plates 60. Said plates 60 are pivoted on projections 61, which are rigidly secured to or form part of member 12. Member 12 is the driven member, rotation being in the direction of arrow 56.

The principle of operation of the embodiment of Fig. 6 and Fig. 7 is the same as in the previously described embodiment. Springs 58 effect pressure between the surfaces engaged in frictional contact. The frictional torque tends to reduce said pressure, so that excess torques fail to be transmitted, because they reduce the pressure of engagement to such an extent that slippage occurs readily.

A chief application of the present invention is to clutches, particularly to automotive clutches and to clutches running in oil or liable to get moistened with oil.

The application to clutches, and particularly to multiple disk clutches, will first be explained with reference to the diagram Fig. 14. The principle of clutches constructed according to the present invention, as will be seen, is the same as the principle of gripping devices in general, with the addition, that means are provided to disengage the clutch from the outside.

Fig. 14 accordingly contains all the elements of Fig. 4, with the addition of means for approaching the sides 29', 32' to disengage the device. These means are diagrammatically shown as a wedge 63, which contacts with the two parts 29, 32 along lines forming an angle 64 with each other. When wedge 63 is moved to the left, referring to Fig. 14, part 29 is moved downward relatively to part 32, against the tension of spring 28. In that motion, groove 35 rolls ball 34 downwardly on groove 36, to the position shown in full lines, thereby approaching the sides 29', 32' and disengaging the clutch.

It is particularly noted that the clutch and safety device are combined in a manner, which requires few additions over the parts either of a safety gripping device or of a friction clutch: The friction members of the clutch and safety device are the same and perform a double function. Moreover spring 28 of the safety device is at the same time the clutch spring, no additional spring being required. The structure is therefore very simple.

Figure 9:
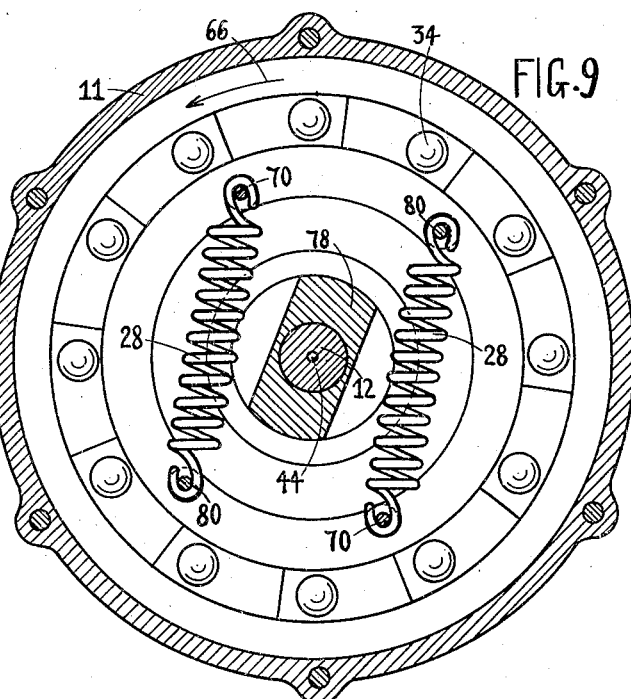
Fig. 9 is a section at right angles to the axis of said clutch, along line 9—9 of Fig. 8.

In the embodiment shown in the Figures 8 and 9, member 11 is the driving member, that is to say the member receiving power from a motor. The driven member 12 is in the form of a shaft, whose projection 65 is journalled in member 11. The drive is in the direction of arrow 66, see Fig. 9.

Shaft 12 is provided with a flange 67, to which is bolted a thin disk 68. Near the outer periphery of said disk, a ring shaped body 69 is secured to said disk by means of screws. The purpose of the disk is to allow for slight misalignments through deformation, as known. Two of the screws, which secure body 69 to disk 68 are of the form shown in Fig. 8, having projecting screw heads 70 with grooves 71 for holding one end of a tension spring 28. Body 69 contacts on side 72 with member 11. On the other side body 69 is provided with helical grooves 73 of circular cross section, each extending a fraction of the circumference. Other helical grooves 74 are provided on a part 18, the two sets of grooves being connected through balls 34, which may roll in said grooves. The grooves and balls are of the character previously described and form guides for moving part 18 relatively to body 69 in a helical path, so that the distance between side 72 of body 69 and side 75 of part 18 may be changed within a certain range. Side 75 of part 18 contacts with a cover 76, which is bolted to member 11. Member 11 may be part of a flywheel, which is not shown in the drawing. Part 18 is connected with a hub 78 by means of a cup 79, and contains two screws 80 having heads as the ones shown at 70. These heads are suited to hold the other ends of tension springs 28. Preferably the projections 70 and 80 are disposed at the same distance from axis 44, in other words the spring is disposed and proportioned in the manner above explained.

What has been thus far described, is a safety gripping device of the character already disclosed, whose principle of operation is the same as the one disclosed. The means for disengaging the clutch will now be described.

Hub 78 is connected with part 18 through cup 79 with considerable rigidity in axial direction. Cup 79 as well as disk 68 allow for angular misalignment only, and are provided with a number of holes or slots in known manner. Hub 78 is mounted on shaft 12 in a manner permitting to a certain extent angular motion on an axis 44. At its right hand side, referring to Fig. 8, hub 78 is provided with projections 82 having helical sides 83. An operating member 84 is slidable along straight axial splines of shaft 12, and possesses projections 85 suited to engage the helical sides 83 of hub 78. Operating member 84 is moved axially in known manner by means of a lever, which is not shown, and which may be operatively connected with a pedal. The position of operating member 84 shown in Fig. 8 corresponds to clutch engagement. When pressing said member to the left, referring to Fig. 8, it maintains a constant angular position relatively to shaft 12 by reason of the straight guides provided on said shaft, and it turns hub 78 on an axis 44 through engagement between the helical sides 83 and projections 85. With hub 78, part 18 is also turned in the direction of arrow 66, thereby increasing the length and tension of springs 28 and decreasing the distance between sides 72 and 75. This continues until that distance is smaller than the distance between the corresponding surfaces of member 11 and cover 76 and until hub 78 comes to a stop at flange 67.

When pressure on operating member 84 is ended, the clutch will again engage, through the energy stored up in the springs 28. A clutch constructed according to the present invention may be engaged very suddenly, without causing any shocks or any undue stresses or excessive acceleration. The clutch operates very smoothly and prevents jumps of a car under all circumstances, whether handled with care or without care.

The operative connection between member 84 and hub 78 amounts to a screw connection, which is known to contain an undesirable large amount of friction. It is particularly noted, that the friction is not confined to the engaged helical sides of member 84 and hub 78, but exists also in about equal degree at the contact between member 84 and sides 83 as well as between member 84 and the said axial guides of shaft 12.

Referring to the Figures 10 and 11, single balls 87 are provided in the individual guides 88 of shaft 12. The balls 87 can roll in a groove 89 having a length about equal to the required roll of the ball. They contact on the other side with an internal projection 90 of member 84, said projection being shown in section in Fig. 11. Balls are provided only on one side of said projections, namely on the side which is under load during operation.

In an analogous manner single balls 91 are provided in grooves of projections 85. The grooves on projections 82 come to a stop on either end, as well as grooves 89, to prevent the balls under all circumstances from rolling out.

Figure 12:
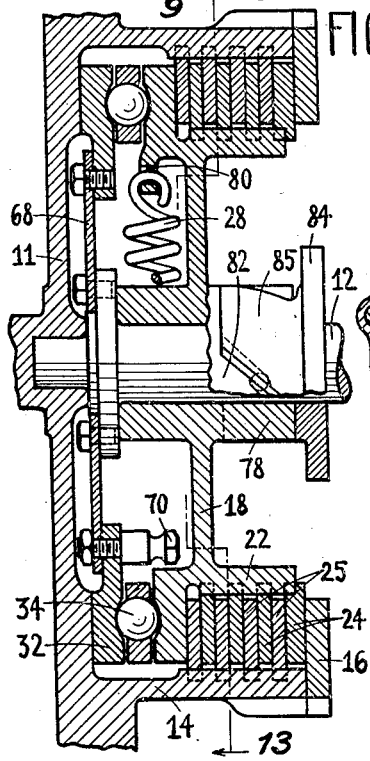
Fig. 12 is an axial section through a multiple disk clutch constructed in accordance with my invention.
Figure 13:
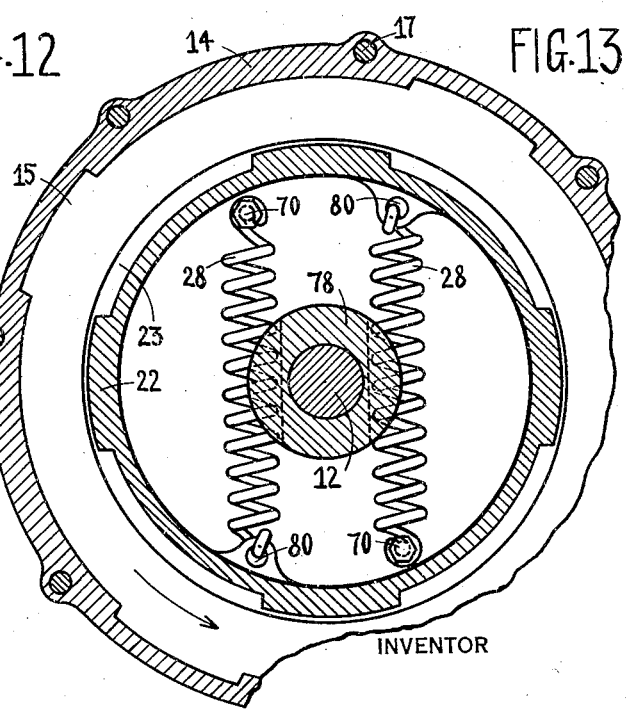
Fig. 13 is a section at right angles to the axis of said clutch, along line 13—13 of Fig. 12.

A further embodiment of the invention is illustrated in the Figures 12 and 13, which refer to the application of my invention to multiple disk clutches.

It is seen, that this application follows the construction of the gripping device shown in Fig. 1 and Fig. 2, with the added feature of means for turning part 18 relatively to shaft 12 an amount sufficient to disengage the frictional surfaces. These means may be made the same as those described with reference to Fig. 8 and Fig. 9, and all the important other parts have been described with reference to Fig. 1 and Fig. 2. The principle of operation has been described with reference to Fig. 14. It is therefore deemed sufficient to illustrate the combination without detailed description.

In the illustrated embodiments of my invention I have shown all the essential parts, while avoiding unnecessary and known details. So I have omitted to show means for adjusting the clutches after wear has taken place. It is however understood, that I may provide such adjustment means or add other known details, without departing from the spirit of my invention. Broadly such modifications and changes may be made in my invention as fall within the scope of the appended claims.

What I claim is:

1. In a friction clutch, two members angularly movable relatively to each other about the axis of the clutch, an operating member movable axially relatively to both said members, spring means for operatively connecting said two members, helical guides disposed on one member, other guides disposed in the second of said members, either guides engaging with said operating member, rolling members disposed in said guides for exerting pressure between either of said two members and the operating member with a minimum of friction.

2. In a friction clutch, two members angularly movable relatively to one another about the axis of the clutch, an operating member movable along straight axial guides relatively to one of said members, helical guides disposed on the other member for engagement with said operating member, the individual straight and helical guides containing single balls, adapted to roll along said guides and to engage said operating member, and spring means for connecting said two members.

3. A friction clutch, containing a driving member and a driven member, said driving member being provided with a frictional surface, a part adapted to engage said surface, a spring connecting said part with the driven member, means for changing the degree of engagement between said part and said frictional surface, said means comprising guides forming part of the driven member and rolling means disposed in said guides, the disposition being such that said spring tends to increase the pressure of said engagement and that the friction exerted upon said part, through said engagement tends to reduce said pressure, and means for effecting angular motion about the axis of the clutch between said part and one of said members, for disengaging the clutch.

4. A friction clutch, containing a driving member and a driven member, one of said members containing a frictional plane, a part adapted to engage said plane, a spring connecting said part with the other of said members, means for changing the degree of engagement between said part and said plane, said means comprising helical guides provided on said other member and balls disposed in said guides, the disposition being such, that said spring tends to increase the pressure of said engagement and that the friction exerted upon said part through said engagement tends to reduce said pressure, and means for effecting angular motion about the axis of the clutch between said part and one of said members, for disengaging the clutch.

5. A friction clutch, containing a driving member and a driven member, a plurality of disks positively connected with one of said members, other disks alternating with the above said disks, a part positively connected with said other disks, a coil spring connecting said part with the other of said members, said coil spring being disposed transversely to the axis of the clutch, means for changing the degree of engagement between said disks, said means comprising helical guides and balls disposed in said guides for moving said part in a helical path relatively to said other member, the disposition being such that said spring tends to increase the pressure of said engagement, and that the friction exerted on said part through said engagement tends to reduce said pressure, and means for effecting angular motion about the axis of the clutch between said part and one of said members, for disengaging the clutch.

6. In a gripping device of the load limiting type, two parts movable relatively to each other in a helical path about the axis of the clutch for effecting various degrees of frictional engagement in direct proportion to the relative displacement of said parts, a coil spring connecting said parts, said spring being so disposed that its center line is offset from the center of said parts a distance changing with the stress of the spring, the offset being smaller when the spring deformation is large and changing at least ten percent in the extreme positions provided for said spring.

7. In a friction clutch, two parts movable relatively to each other in a helical path about the axis of the clutch for effecting various degrees of frictional engagement in direct proportion to the relative displacement of said parts, a tension spring connecting said parts, said tension spring being attached to said parts at points offset in opposite directions from the point of closest approach of the center line of the spring toward the axis of said clutch, said points being each offset a distance larger than one quarter of the length of the spring.

8. In a friction clutch, two parts movable relatively to each other in a helical path about the axis of the clutch for effecting various degrees of frictional engagement in direct proportion to the relative displacement of said parts, a pair of tension springs connecting said parts, the center line of a spring being disposed substantially in a plane perpendicular to the axis of the clutch, and the ends of said spring being attached to said parts in points having substantially equal distances from the axis of the clutch.

9. In a gripping device of the load limiting type, a driving element and a coaxial driven element, a part angularly movable relatively to said elements about the axis of the gripping device, an operative connection between said part and one of said elements for effecting various degrees of frictional engagement transmitting torque between said part and the other of said elements, the degrees of frictional engagement being in direct proportion to the angular motion of said part relatively to said one element, a coil spring connecting said part and said one element and disposed transversely to the axis of said gripping device, said operative connection and the disposition of said coil spring being interrelated in a manner that the ratio between the deformation of said spring and the degree of frictional engagement changes so that an equal reduction in the deformation of said spring approaches the cooperating frictional surfaces at a faster rate when the spring deformation is large, said ratio varying at least ten percent in the extreme positions provided for said spring.

ERNEST WILDHABER.